US009338098B2

(12) United States Patent
Gupta

(10) Patent No.: US 9,338,098 B2
(45) Date of Patent: May 10, 2016

(54) DYNAMIC FLOW MANAGEMENT AT A FIREWALL BASED ON ERROR MESSAGES

(71) Applicant: CELLCO PARTNERSHIP, Basking Ridge, NJ (US)

(72) Inventor: Praveen Gupta, Pleasanton, CA (US)

(73) Assignee: Cellco Partnership, Basking Ridge, NJ (US)

(*) Notice: Subject to any disclaimer, the term of this patent is extended or adjusted under 35 U.S.C. 154(b) by 658 days.

(21) Appl. No.: 13/713,810

(22) Filed: Dec. 13, 2012

(65) Prior Publication Data
US 2014/0173085 A1    Jun. 19, 2014

(51) Int. Cl.
G06F 15/16 (2006.01)
G06F 17/00 (2006.01)
*H04L 12/801* (2013.01)
*H04L 12/825* (2013.01)
H04L 29/12 (2006.01)
H04L 29/06 (2006.01)
H04W 4/24 (2009.01)

(52) U.S. Cl.
CPC .............. *H04L 47/14* (2013.01); *H04L 47/266* (2013.01); *H04L 61/2575* (2013.01); *H04L 63/02* (2013.01); *H04W 4/24* (2013.01)

(58) Field of Classification Search
CPC .................. H04L 47/14–47/15; H04L 47/266; H04L 61/2575; H04L 63/02; H04L 63/029; H04L 63/0254; H04W 4/24
USPC ...................... 709/203, 223–224; 726/1, 9, 11
See application file for complete search history.

(56) References Cited

U.S. PATENT DOCUMENTS

| | | | |
|---|---|---|---|
| 6,757,248 B1* | 6/2004 | Li | H04L 1/1858 370/235 |
| 7,551,621 B1* | 6/2009 | Hedge | H04L 47/10 370/235 |
| 8,493,859 B2* | 7/2013 | Elliot | H04L 1/1825 370/235 |
| 8,588,056 B1* | 11/2013 | Choi | H04L 43/16 370/216 |
| 2002/0122394 A1* | 9/2002 | Whitmore | H04L 12/2854 370/328 |
| 2002/0141448 A1* | 10/2002 | Matsunaga | H04L 29/06 370/469 |
| 2004/0170181 A1* | 9/2004 | Bogdon | H04L 12/5692 370/400 |
| 2005/0075119 A1* | 4/2005 | Sheha | G01C 21/26 455/456.6 |
| 2005/0135261 A1* | 6/2005 | Lee | H04L 1/0045 370/241 |
| 2007/0143827 A1* | 6/2007 | Nicodemus | G06F 21/6218 726/2 |
| 2007/0143851 A1* | 6/2007 | Nicodemus | G06F 21/55 726/25 |

(Continued)

OTHER PUBLICATIONS

Firewall (computing)—Wikipedia, <http://en.wikipedia.org/wiki/Firewall_(computing)> Retrieved Oct. 3, 2012; 6 pages.

(Continued)

*Primary Examiner* — Viet Vu
*Assistant Examiner* — Michael A Chambers

(57) ABSTRACT

A method and system are provided for blocking data packets that are not desired or capable of being received. One or more data packets are received from a data server. The data packets that are addressed to a wireless device are transmitted via a gateway server. The error messages generated by either the wireless device or the gateway server are forwarded to the data server and their number also counted. When the number of error messages meets a predetermined criterion, additional data packets from the data server that are addressed to the wireless device are blocked, for example, preventing tolling the user account of the wireless device for data packets sent by the data server when the device is not available or the user no longer wants to receive the data.

22 Claims, 4 Drawing Sheets

(56) References Cited

U.S. PATENT DOCUMENTS

| | | | | |
|---|---|---|---|---|
| 2008/0016562 A1* | 1/2008 | Keeni | H04L 63/1408 | 726/22 |
| 2008/0310340 A1* | 12/2008 | Isozu | H04L 45/10 | 370/328 |
| 2008/0320580 A1* | 12/2008 | Hamilton, II | G06F 21/57 | 726/11 |
| 2010/0131668 A1* | 5/2010 | Kamath | H04L 47/32 | 709/233 |
| 2011/0153724 A1* | 6/2011 | Raja | H04L 67/325 | 709/203 |
| 2011/0190016 A1* | 8/2011 | Hamabe | H04W 24/10 | 455/507 |
| 2011/0269441 A1* | 11/2011 | Silver | H04W 4/027 | 455/418 |
| 2011/0300888 A1* | 12/2011 | Sakumoto | H04W 76/068 | 455/509 |
| 2012/0084232 A1* | 4/2012 | Kurabayashi | H04M 15/80 | 705/400 |
| 2012/0100847 A1* | 4/2012 | Rahman | H04W 24/08 | 455/424 |
| 2012/0233656 A1* | 9/2012 | Rieschick | H04L 63/1441 | 726/1 |
| 2014/0075537 A1* | 3/2014 | Kim | H04L 67/00 | 726/13 |
| 2014/0098671 A1* | 4/2014 | Raleigh | H04M 15/80 | 370/235 |
| 2014/0337520 A1* | 11/2014 | Raleigh | H04L 67/2804 | 709/224 |

OTHER PUBLICATIONS

Stateful firewall—Wikipedia; <http://en.wikipedia.org/wiki/Stateful_firewall>. Retrieved on Oct. 3, 2012; 4 pages.

UDP hole punching—Wikipedia <http://en.wikipedia.org/wiki/UDP_hole_punching>. Retrieved on Oct. 3, 2012; 3 pages.

Application firewall—Wikipedia <http://en.wikipedia.org/wiki/Application_layer_firewall>. Retrieved Oct. 3, 2012; 7 pages.

* cited by examiner

DYNAMIC FLOW MANAGEMENT AT A FIREWALL BASED ON ERROR MESSAGES

BACKGROUND

In recent years, multimedia transmission has become increasingly popular. Various forms of data transmission include unicast, multicast, and broadcast. In unicast transmission, data (e.g., in the form of Internet Protocol (IP) packets) is sent to a single network destination identified by a unique IP address. Certain network applications which are mass-distributed are too costly to be conducted with unicast transmission since each logical network connection consumes computing resources on the sending host and requires its own separate network bandwidth for transmission. Such applications include streaming multimedia of many forms, where audio and video signals are captured, compresses and transmitted to a group of receivers but on an individual basis. For example, internet radio stations using unicast connections may have high bandwidth costs.

Instead of using a set of point-to-point connections between the participating nodes, broadcasting and multicasting can be used for distribution of multimedia data to any number of receivers (e.g., destination computing devices). Broadcasting refers to transmitting data that is received by every device on the network.

Multicasting is the delivery of a message or data to a group of destination computing devices simultaneously in a single transmission from a source such as a multimedia server. Multicasting is a technique for one-to-many communication over an IP infrastructure in a network. It scales to a larger receiver population by not requiring prior knowledge of who or how many receivers there are. Multicasting uses network infrastructure efficiently by requiring the source to send a packet only once, even if it needs to be delivered to a large number of receivers. For example, in Internet Protocol Television (IPTV), data for television services is multicast using the Internet protocol suite over a packet-switched network such as the Internet, instead of being delivered through traditional terrestrial, satellite signal, and cable television formats.

Different transport layer protocols can be used to transmit multimedia content. For example, Transmission Control Protocol (TCP) is one of the two original components of the Internet Protocol Suite, complementing the Internet Protocol (IP). Accordingly, the entire suite is commonly referred to as TCP/IP. TCP provides delivery of a stream of octets from a program on a source (e.g., server) to a destination (e.g., client program or wireless device). TCP is the protocol used by major Internet applications such as the World Wide Web, email, remote administration and file transfer. Other applications, which do not require reliable data stream service, may use the User Datagram Protocol (UDP), which provides a datagram service that emphasizes reduced latency over reliability. By its nature, UDP is not reliable in that messages are frequently lost or delivered out of order. UDP uses a simple transmission model with a minimum reliance on protocol. For example, it has no handshaking dialogues, and thus exposes the user's program to any unreliability of the underlying network protocol. As this is normally IP multimedia over unreliable network transport, there is no guarantee of delivery, ordering, or duplicate protection.

The flexibility in joining and leaving a group provided by multicasting, although making variable membership easier to handle, is not without consequences. The simple transmission model and the unreliability of the protocol that is typically used in multicast can make it difficult to measure the amount of data received by a wireless device. However, billing/payment for many wireless data plans is based in whole or in part on the amount of data communicated to and from the wireless device.

For example, a user of a wireless device may no longer wish to receive content from a multimedia server. Accordingly, the user may attempt to leave an audio-cast or a video-cast by shutting down an application on the wireless device that is configured to receive the content from the multimedia server. Alternatively, the wireless device may simply run out of battery. However, a gateway server that is between the wireless device and the multimedia server may continue to receive data from the multimedia server and attempt to provide this data to the wireless device. As the gateway server is typically employed by the network to determine data usage of the wireless device (based on transmission, whether or not successfully received), the network operator continues charging the user account of the wireless device for transport of data for the multimedia service through the wireless network. Currently, there is no reliable system and method to prevent a user account of the wireless device to continue to be tolled for broadcast and/or multicast data that is being streamed from the multimedia server intended for delivery to the wireless device even though that device may have stopped receiving the data via a unicast wireless network communication channel.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The various examples discussed below enable blocking data from reaching a gateway server that is between a wireless device and a multimedia server or the like when appropriate criteria are met. By preventing the data from reaching the gateway server, a user account of the wireless device is not tolled for the data. In more specific examples, when a wireless device is no longer willing or capable of receiving data from the multimedia server (e.g., multimedia content), the data is blocked from reaching a gateway server that is configured to calculate the amount of data addressed to the wireless device from the multimedia server.

Figure 1:
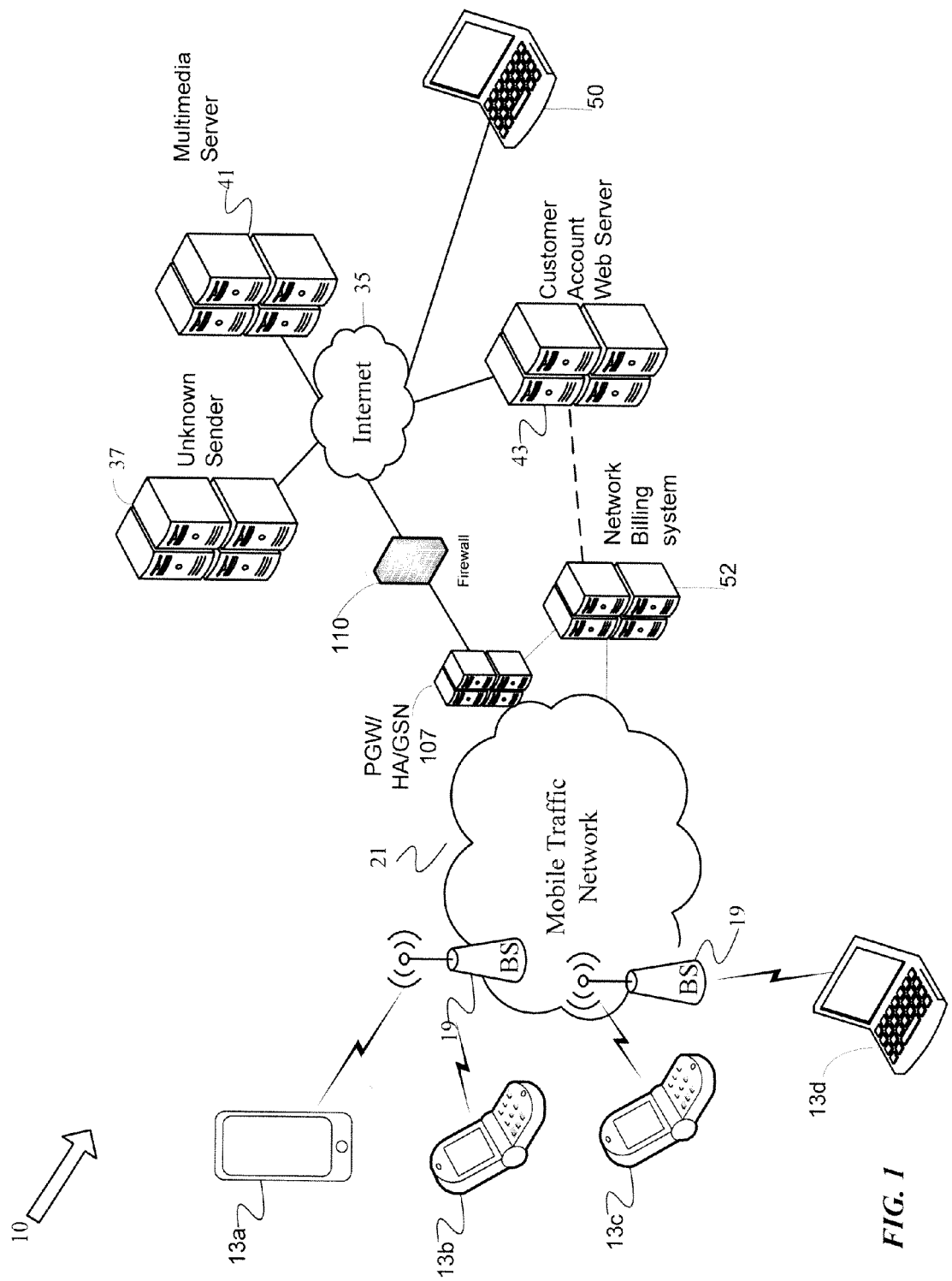
FIG. 1 illustrates a wireless packet data communication network for providing mobile communications for wireless devices as well as a system providing protection for the wireless device from being tolled for data that is not received by the wireless device.

Reference now is made in detail to the examples illustrated in the accompanying drawings and discussed below. FIG. 1 illustrates a number of wireless devices, a mobile communication network coupled to another communication network and several systems/elements associated with or included in the mobile network for various functions as may be involved in providing multimedia content to a wireless device, determining status of data usage with respect to plan limits and blocking data that is no longer requested or acceptable.

Thus, FIG. 1 illustrates a mobile communication system 10 that includes a mobile traffic network 21 that is coupled to one or more servers (e.g., 37, 41, and 43) through the internet 35. The mobile traffic network 21 may be operated by a carrier or service provider to provide a wide range of mobile communication services and ancillary services or features to its subscriber customers and associated wireless device users. The elements generally indicated by the reference numeral 21, the base stations 19, wireless devices 13a to 13d, server 107 and firewall 110 generally are elements of the mobile traffic network 21 and are operated by or on behalf of the carrier, although the wireless devices typically are sold to the carrier's customers. The mobile communication system 10 provides communications between wireless devices as well as communications for the wireless devices with networks and stations outside the mobile communication network 21.

For purposes of later discussion, several wireless devices appear in the drawing, to represent examples of the wireless devices that may receive various services via the mobile communication system 10. Today, wireless devices typically take the form portable handsets, smart-phones, tablet computers, or personal digital assistants (PDAs), although they may be implemented in other form factors, including consumer and business electronic devices. The wireless devices 13a, 13b, 13c, and 13d, for example, may take the form of a mobile telephone station, enhanced with display and user input capabilities to support certain text and image communications, such as email, picture communication, and web browsing applications.

The mobile communication system 10 may allow users of the wireless devices to initiate and receive telephone calls to each other as well as through the public switched telephone network (PSTN) and telephone stations connected thereto. The network 10 typically offers a variety of data services via the Internet 35, such as downloads, web browsing, e-mail, multimedia content, etc. The mobile communication system 10 typically is implemented by a number of interconnected networks. Hence, the mobile communication system 10 may include a number of radio access networks (RANs), as well as regional ground networks interconnecting a number of Radio Access Networks (RANs) and a wide area network (WAN) interconnecting the regional ground networks to core network elements, such as the Multimedia Messaging Service Centers (MMSCs). A regional portion of the mobile communication system 10, such as that serving wireless devices 13a to 13d will typically include one or more RANs and a regional circuit and/or packet switched network and associated signaling network facilities.

Physical elements of a RAN, operated by one of the mobile service providers or carriers, include a number of base stations represented in the example by the base stations (BSs) 19. Such base stations 19 typically comprise a base transceiver system (BTS) which communicates via an antennae system at the site of base station and over the airlink with one or more of the wireless devices 13a to 13d when the wireless devices are within range. Each base station 19 typically includes a BTS coupled to several antennae mounted on a radio tower within a coverage area often referred to as a "cell."

The BTS is the part of the radio network that sends and receives RF signals to/from the wireless devices that the base station currently serves.

The radio access networks also include a traffic network represented generally by the cloud at 21, which carries the user communications for the wireless devices 13a to 13d between the respective base stations 19 and other elements with or through which the wireless devices 13a to 13d communicate. Individual elements such as switches and/or routers forming the traffic network 21 are omitted here for simplicity.

The traffic network portion 21 of the mobile communication system 10 connects to a public packet switched data communication network, such as the network commonly referred to as the "Internet" shown at 35. Packet switched communications via the traffic network 21 and the Internet 35 may support a variety of user services through the mobile communication system 10, such as wireless device communications of text and multimedia messages, e-mail, web surfing or browsing, programming and multimedia downloading (including audio and video), etc. For example, the wireless devices may be able to receive data (e.g., multimedia content) from one or more servers. The drawing shows two such servers (i.e., server 37 and multimedia server 41) by way of example.

Of note for purposes of this discussion, the content provided by the multimedia server discussed herein may be sent to various wireless devices using the mobile traffic network 21 (e.g., a packet data network (PDN)) by User Datagram Protocol (UDP). The Evolved Packet Core (EPC) of network 21 uses the concept of Evolved Packet System (EPS) bearer channels to route IP traffic from a gateway server 107 in the network 21 to the wireless device (e.g. 13a to 13d). A bearer channel is an IP packet flow with a defined quality of service (QoS) between the Packet Data Network (PDN) Gateway (PGW) server 107 and the wireless device (e.g., 13a to 13d). It is within these packets that the data is sent to a wireless device (13a to 13d). For example, the wireless device (13a to 13d) receives data (e.g., multimedia content) via a unicast wireless network communication channel.

In one example, the gateway server 107 is configured to determine data usage for the account associated with the mobile device 13a. Thus, every data packet received by gateway server 107 addressed to or originating from the mobile device 13a is counted by the gateway server for account billing purposes. It should be noted that while a single gateway server 107 is illustrated in FIG. 1 for simplicity, different types of gateway servers may be used for different wireless technologies. For example, a high availability (HA) server can be used for 3G; a PGW server for 4G; general packet radio service core network (GGSN) for 2G, 3G, and wideband code division multiple access (WCDMA); etc. The different types of gateway servers are collectively referred to herein as "gateway server 107." Also, the counts are typically collected and processed through other systems (not shown) for bill processing or account debiting.

In one example, mobile traffic network 21 is protected by a firewall 110. The firewall 110 provides a security layer to maintain secure communications between the wireless devices (e.g., 13a to 13d) and the internet 35 to prevent unauthorized access by devices external to the mobile traffic network 21. The firewall 110 can either be software based (e.g., code on a server) or hardware based (e.g., a server). In one example, the firewall 110 controls the incoming and outgoing network traffic by analyzing the data packets and determining whether the data should be allowed through or not, based on a predetermined rule set. For example, if a packet matches the packet filter's set of rules, the packet filter will drop (e.g., discard) the packet, or reject it (e.g., send an error response to the source). Thus, the firewall 110 builds a bridge between the mobile traffic network and the internet 35 that may not be secure and/or trusted. In one example, the firewall 110 or the features thereof are included in the gateway 107.

In one aspect, firewall 110 monitors messages from a wireless device (e.g., 13*a*) and/or gateway server 107. For example, the wireless device 13*a* may include one or more clients (e.g., application programs) that run on the wireless device and that are configured to receive content from the multimedia server 41 through the network 21. When the wireless device 13*a* (that is currently receiving content from a multimedia server 41) no longer wishes to receive such content, the application may send a message to the multimedia server 41 that the content is no longer desired. For example, such message is triggered when the application that plays the content (e.g., browser, multimedia player, etc.,) is closed, or when the wireless device 13*a* itself is turned OFF (and/or runs out of power). In one example, an Internet Control Message Protocol (ICMP) ERROR message is generated by the application and sent to the multimedia server 41 through the gateway server 107 and firewall 110. The ICMP is one of the core protocols of the Internet Protocol Suite. ICMP errors are generally directed to the source IP address of the originating packet (e.g., multimedia server 41 in this example). Although ICMP messages are contained within standard IP datagrams, ICMP messages can be processed as a special case, distinguished from normal IP processing, rather than processed as a normal sub-protocol of IP. In one example, an ICMP ERROR message is used to send error messages indicating, for example, that the content from the media server 41 is no longer desired. The firewall 110 is configured to monitor such messages and keep a count on the number of error messages that are addressed to the multimedia server 41.

In one example, the wireless device 13*a* may run out of battery, be turned OFF, or simply not be within range of a base station 19. The gateway server 107, upon determining that there is no response from the wireless device 13*a*, sends an error message (e.g., ICMP ERROR) to the multimedia server 41 indicating that the wireless device cannot be reached. For example, when the wireless device 13*a* powers OFF, it deregisters itself from the network 21 (e.g., via ICMP ERROR message) and deletes all active connections from the network 21. For example, the PGW 107 maintains a wireless device "connection instance" with an IP-address assigned to the device 13*a*. When the wireless device 13*a* cannot be reached, the break in the wireless connection between wireless device and the gateway server 107 is detected by other network-elements (such as Evolved Node B (eNB) or Serving Gateway (SGW)—not shown). In this regard, a "connection instance" at the gateway server 107 is deleted, thereby indicating that the wireless device 13*a* is not available.

As discussed above, the firewall 110 monitors messages and keeps a count on the number of error messages that are addressed to the multimedia server 41 (e.g., the server that is currently providing the multimedia content to the wireless device 13*a*). When the number of error messages (e.g., ICMP ERROR) exceeds a predetermined threshold within a predetermined time, the firewall 110 blocks any data packets from the multimedia server 41 (that is meant to receive the ICMP ERROR messages). For example, once the firewall 110 has closed IP-flow from the Internet 35 to the wireless device 13*a*, only the wireless device 13*a* can re-establish IP-flow at the firewall 110.

It should be noted that the firewall 110 does not alter messages from the mobile device 13*a* or gateway server 107. Rather, the firewall 110 allows data flow in the direction of the multimedia server 41 but blocks data from the multimedia server 41 when appropriate criteria are met, as described herein. Upon determining that the number of error messages addressed to the multimedia server 41 (whether from the wireless device 13*a* or the gateway server 107) is below a second predetermined threshold within a predetermined time or the wireless device 13*a* requests additional content from the multimedia server 41, the firewall 107 stops blocking data from the multimedia server 41. As a result, the gateway server 107 continues calculating the amount of data received from the multimedia server 41.

Blocking data after the predetermined criteria are met not only preserves the resources of the mobile traffic network 21 but also prevents the gateway server 107 from tolling the wireless device 13*a* user account. Thus, the wireless device 13*a* user account is only tolled for the data (e.g., multimedia content) that it receives.

Mobile communication system 10 includes one or more servers (e.g., 37, 41, and 43) to provide, among other services, data to receivers such as wireless devices 13*a* to 13*d*. For example, multimedia server 41, which is coupled for communication via the Internet 35, may provide multimedia content to wireless devices 13*a* to 13*d*. In one example, multimedia server 41 is an IPTV server. Accordingly, multimedia server 41 may provide television services that are delivered to one or more wireless devices (e.g., 13*a* to 13*d*) as a unicast connection between the wireless device 13*a* and the mobile traffic network 21 over the internet 35. For discussion purposes, we will assume that multimedia server 41 is currently streaming content to one or more wireless devices (e.g., 13*a* to 13*d*) while server 37 is not currently streaming any content.

In one example, a customer account web server 43 provides the subscribers of the mobile traffic network 21 on-line access to a variety of functions related to the subscribers' accounts, such as review of billing statements and usage data, on-line payment, subscription changes, password control or the like. A wireless device (e.g., 13*a* to 13*d*) may be used to access the data from the customer account web server 43 through the mobile traffic network 21 and internet 35. Alternatively or in addition, a PC may be used to access on-line information about a subscriber's account directly over the Internet 35, as illustrated by terminal 50.

In one example, gateway server 107 interacts with a billing server 52 through the mobile traffic network 21 to provide data usage information of the respective wireless device 13*a* to the billing server 52. In one example, the billing server 52 is part of the account web server 43, as indicated by the dotted line between the billing server 52 and the customer account web server 43 in FIG. 1. Accordingly, the billing server 52 may be accessible via the Internet 35.

As discussed before, the gateway server 107 is part of the data path between the wireless device 13*a* and the multimedia server 41 and monitors how much data is used at any given time with respect to the wireless device 13*a*. For example, this data usage is communicated to the billing system 52 and/or account web server 43 for billing purposes. In various examples, the billing information can be provided to the customer account web server 43 through the billing system 52 or through the Internet 35.

The multimedia server 41 may be implemented on a single hardware platform. However, to provide effective streaming of content to a large number of wireless devices, the multimedia server 41 for the associated example of streaming content may utilize a distributed system architecture.

Figure 2:
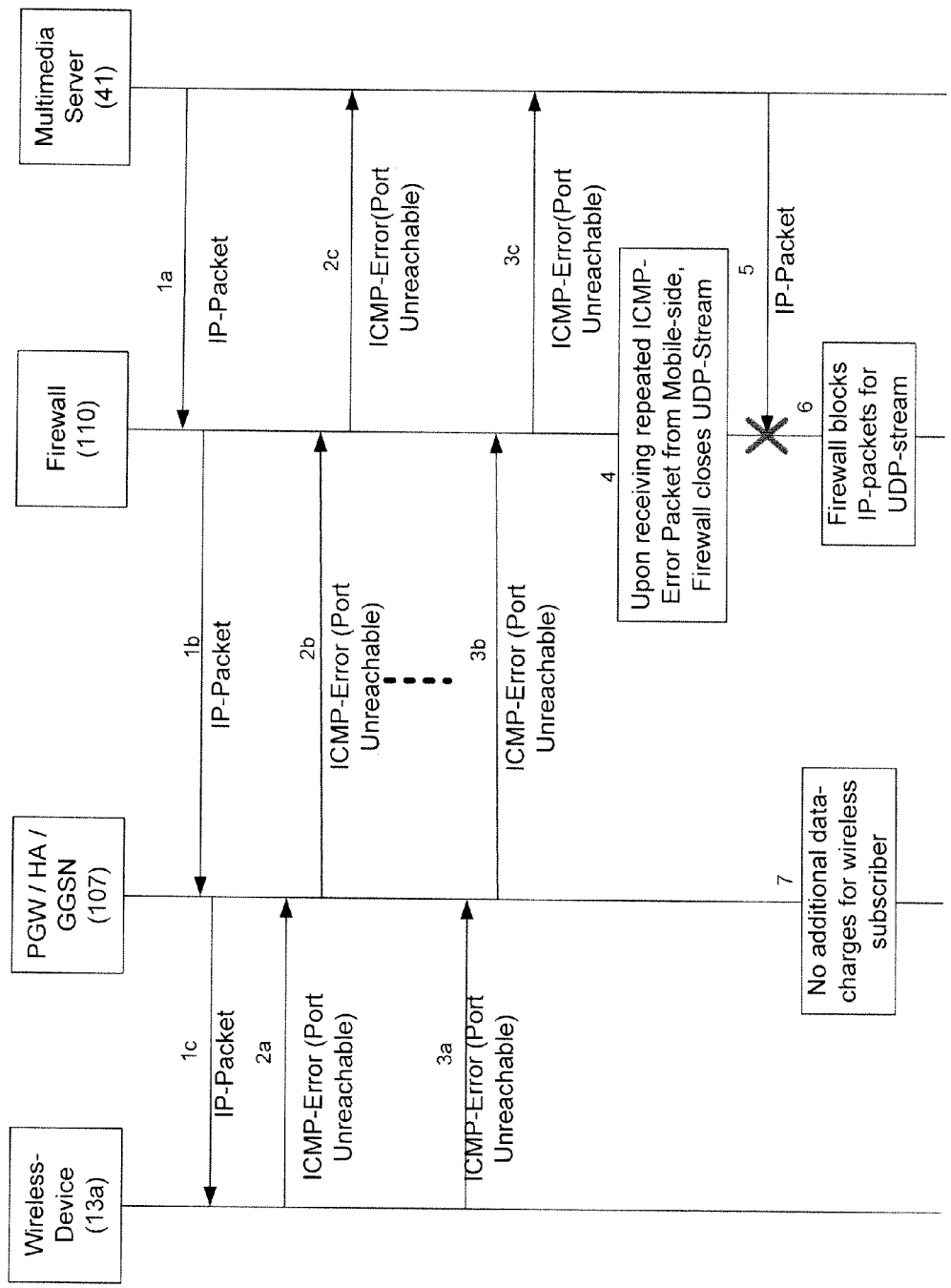
FIG. 2 illustrates an exemplary call flow where a wireless device no longer wishes to receive additional data from a server.

With the foregoing overview of the system, it may be helpful now to consider a high-level discussion of an example of a dynamic flow management by using a firewall 110. FIG. 2 illustrates an exemplary call flow where a wireless device no longer wishes to receive additional content from a server. In the example of FIG. 2, an assumption is made that a valid connection exists between the wireless device 13*a* and multimedia server 41. In step 1*a*, multimedia server 41 streams content in the direction of the wireless device 13*a*. The content is routed through the internet 35 and intercepted by the firewall 110. As discussed above, the content provided by the multimedia server 41 is in the form of IP-packets that may be TCP and/or UDP.

In step 1*b*, the firewall 110 analyzes the data packets received from the multimedia server 41 and determines whether the data packets should be allowed through, based on a predetermined rule set. Thus, the firewall 110 builds a bridge between the internal network represented by the gateway server 107, mobile traffic network 21, and the wireless device 13*a*, and the outside world, represented by the internet 35. In one example, in addition to determining whether the data packet is secure, the firewall 110 also determines whether the data from the multimedia server 41 can be routed to the gateway server 107 based on one or more criteria. In one example, the criteria includes whether a predetermined number of error messages were received from the wireless device 13*a* (or the gateway server 107) within a predetermined time. In one example, the criteria is included as part of the predetermined rule set. The criteria (which may be part of the rule set) are discussed in more detail in the steps below.

In step 1*c* the gateway server 107 receives the data from the firewall 110 and forwards this data to the wireless device 13*a*. As discussed above, the gateway server 107 is also responsible for tracking data usage for the respective wireless device 13*a*. For example, the more data that reaches the gateway server 107 in the direction of the wireless device 13*a*, the more the user account of the wireless device 13*a* is tolled.

Assume now that an application on the wireless device 13*a* that is configured to receive/process the content from the multimedia server 41 no longer wishes to receive additional data (e.g., multimedia content) from multimedia server 41. For example, a user of the wireless device 13*a* turns OFF an application (e.g., audio and/or video viewer). In this regard, (i.e., step 2*a*) an error message is generated by the wireless device 13*a* to indicate that the wireless device 13*a* no longer wishes to receive additional data (e.g., multimedia content) from the multimedia server 41. In one example, the error message is an ICMP ERROR notification that is sent to the gateway server 107. Since the multimedia server 41 may be providing a multicast stream, individual ICMP ERROR messages from the wireless device 13*a* may not stop the stream from the multimedia server 41. For example, if there is a multicast router (e.g., special router) in the path from the wireless device 13*a* to the multimedia server 41, then the router can be programmed to read the ICMP ERROR messages and stop the mapping of multimedia stream towards the gateway server 107.

In step 2*b*, the gateway server 107 sends the error message (e.g., ICMP ERROR) to the firewall 110. In one example, the gateway server 107 further tolls the user account of wireless device 13*a* for sending this error message.

In step 2*c*, the firewall receives the error message (e.g., ICMP ERROR) and sends the error message to the multimedia server 41. For example, the error message is not altered but simply forwarded to the multimedia server 41. In one example, the error message is only forwarded to the multimedia server 41 that sent the prior packet data (e.g., multimedia content). Further, the firewall 110 counts every instance an error message (e.g., ICMP ERROR) is received by the firewall 110. If the time between consecutive error messages (e.g., ICMP ERROR) is above a predetermined first time threshold then the error count is reset (prior to stopping transmission to the gateway server 107).

In one example, if a non-ICMP IP response-packet or a count of consecutive non-ICMP IP-response-packets is sent by the wireless device 13*a* to the multimedia server 41, then the error count is reset. As to the threshold number of error messages, they may be based on a predetermined count of consecutive ICMP-error packets observed at the firewall 110. If this consecutive-count exceeds a predetermined threshold, then the IP-flow at the firewall 110 is terminated. In another example, the ICMP-error message count is calculated as a percentage of the incoming packets from the multimedia server. If the percentage of the ICMP-packet response to incoming IP-packets exceed a predetermined percentage-threshold, the IP-flow is terminated at the firewall 110. In both examples, the error count is compared to a predetermined threshold for a time interval. If the error count does not reach the predetermined threshold, the firewall 110 connection is kept alive. Another condition which may cause IP-flow termination at firewall is a situation in which ICMP ERROR packets are sent back by the wireless device 13*a* for a predetermined number of packets and then additional ICMP-ERROR packets from mobile device are not generated. In such a scenario, IP-response packets are not sent thereafter while incoming IP-packet flow continues unabated. In this condition, if no IP-response packets are received by the firewall 110 for incoming IP-packets for a predetermined time-threshold then the IP-flow is terminated at the firewall 110.

In response to incoming IP-packets from the multimedia server 41, additional error messages (e.g., ICMP ERROR) are generated by the wireless device 13*a*, as indicated by steps 3*a* to 3*c* and the dotted lines. Each error message is forwarded to the multimedia server 41 and counted by the firewall 110. When the number of error messages exceeds a predetermined threshold within a second predetermined time then the firewall prevents any further data (e.g., UDP stream content) from the multimedia server 41 (i.e., step 4). For example, the criteria may be 5 error messages per second. In one example, when the number of error messages exceeds a predetermined threshold within a predetermined count of incoming IP-packets, then the firewall prevents any further data from the multimedia server 41 (i.e., step 4).

Thus, any additional content that is provided by the multimedia server 41 is blocked by the firewall (i.e., steps 5/6). Put differently, the multimedia server 41 that originally provided the data (e.g., content) to the wireless device 13*a* and was subject to receiving the error messages (e.g., ICMP ERROR) is no longer allowed to reach the gateway server 107. Accordingly, since the gateway server 107 calculates data usage, the user account of the wireless device 13*a* cannot be tolled for the content provided by the multimedia server 41 (i.e., step 7).

In one example, transmission of data packets from the data server addressed to the wireless device via the gateway server is resumed when error messages are no longer received at a predetermined rate (either from the gateway server 107 or the wireless device 13*a*). For example, when the firewall 110 determines that the number of error messages are below a second threshold within a second predetermined time, transmission of data packets from the data server to the wireless device 13*a* is resumed. In one example, the first threshold is equal to the second threshold and the first predetermined time is equal to the second predetermined time.

Figure 3:
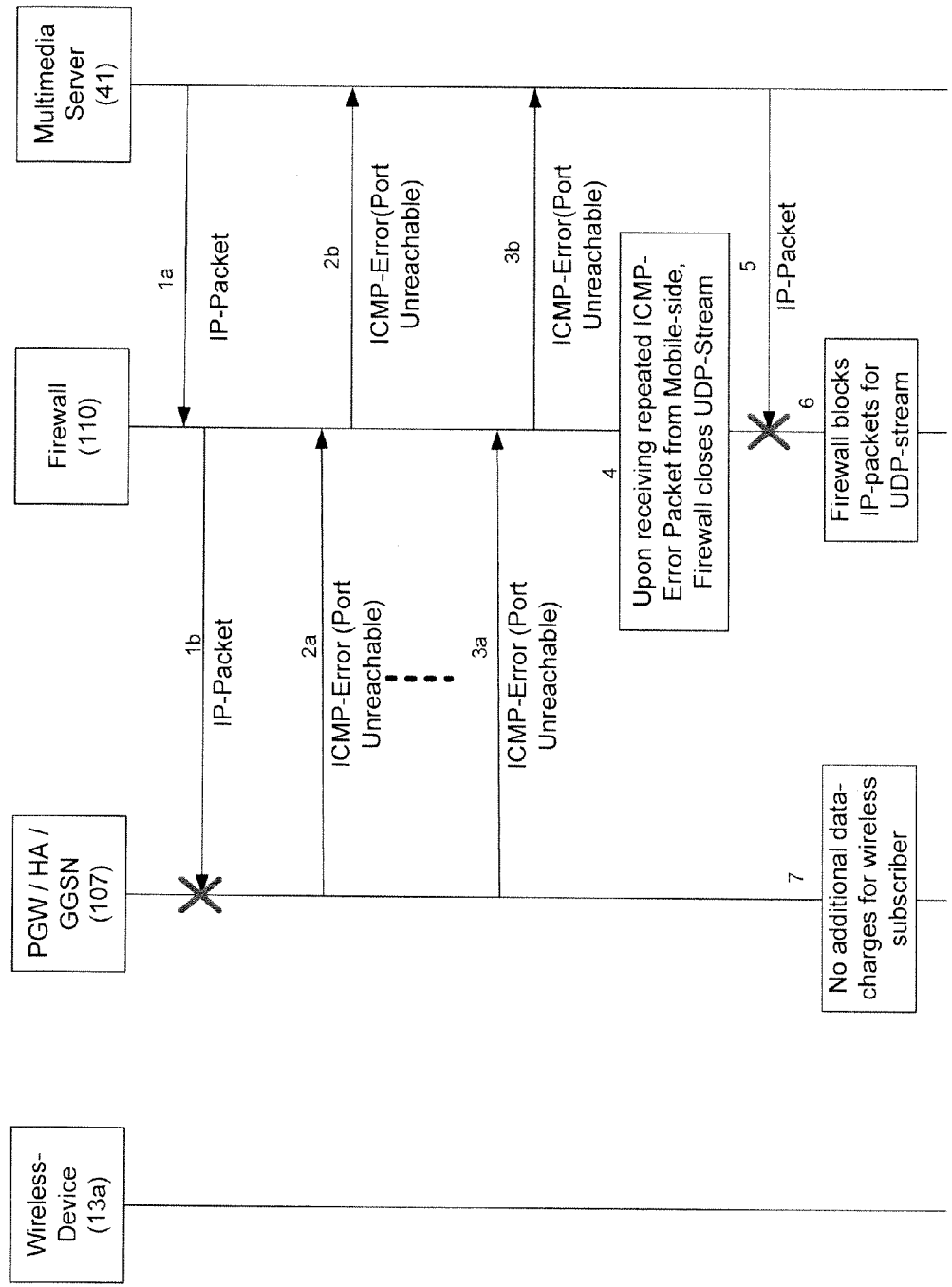
FIG. 3 illustrates an exemplary call flow where a wireless device is not available to receive data from a server.

The firewall 110 does not require error messages from a wireless device (e.g., 13a to 13d) in order to trigger blocking of data from a content provider. Indeed, in one example, the firewall 110 can make the determination to block the data from the content provider when the wireless device (e.g., 13a to 13d) is simply unavailable. For example, the wireless device 13a may be out of battery, turned OFF, or simply out of range of a base station 19. Thus, the wireless device may not be capable of providing an error message. For example, the inactivity of the wireless device 13a is indicated when the mobile traffic network 21 removes an active session related to the wireless device 13a and renders the destination address (e.g., mobile device IP address) of the IP packet unavailable to route any data packages thereto. In this regard, FIG. 3 illustrates an exemplary call flow where a wireless device is not available to receive data from a content provider (or to generate error messages). In step 1a, multimedia server 41 streams content in the direction of the wireless device 13a. The content is routed through the internet 35 and intercepted by the firewall 110. As discussed above, content provided by the multimedia server 41 is in the form of IP data packets that may be TCP and/or UDP.

In step 1b, the firewall 110 analyzes the data packets received from the multimedia server 41 and determines whether the data packets should be allowed through, based on a predetermined rule set. In one example, in addition to determining whether the data packet is secure, the firewall 110 also determines whether the data from the multimedia server 41 can be routed to the gateway server 107 based on one or more criteria. For example, the criteria is whether a predetermined number of error messages were received by the firewall 110 from the wireless device 13a (or the gateway server 107) within a predetermined time. At this point, the gateway server may or may not know whether the wireless device is available.

In step 2a, the gateway server 107 receives the data from the firewall 110 and attempts to forward the data to the wireless device 13a. For example, since data reaches the gateway server 107 in the direction toward the wireless device 13a the user account of the wireless device 13a is tolled by the gateway server 107 regardless of whether the content reaches the wireless device 13a.

Assume now that the wireless device 13a is not available to receive the data from the gateway server 107. For example, as mentioned above, the wireless device 13a may be out of battery, turned OFF, or simply out of range of a base station 19. In this regard, when the gateway server 107 does not have the destination-IP address of the wireless device 13a active in the mobile traffic network 21 or cannot reach the wireless device within a predetermined time, an error message is generated by the gateway server 107 to indicate that the wireless device 13a is no longer available (i.e., the IP address of the wireless device 13a is no longer active) (i.e., step 2a). Thus, the wireless device cannot receive additional data (e.g., multimedia content) from the multimedia server 41. In one example, the error message generated by the gateway server is an ICMP ERROR notification that is sent to the multimedia server 41 via the firewall 110.

In step 2b, the firewall receives the error message (e.g., ICMP ERROR) from the gateway server 107 and sends it to the multimedia server 41. For example, the error message is not altered but simply forwarded to the multimedia server 41. As discussed in the context of FIG. 2, the error message is only forwarded to the multimedia server that sent the prior packet data (e.g., multimedia content). Further, the firewall 110 counts every instance an error message (e.g., ICMP ERROR) is received by the firewall 110. If the time between consecutive error messages (e.g., ICMP ERROR) is above a predetermined first time threshold then the error count is reset. In one example, if the time between consecutive error messages (e.g., ICMP ERROR) is above a predetermined consecutive non-ICMP response packet count threshold then the error count is reset.

As to the threshold number of error messages, they may be based on a predetermined count of consecutive ICMP-error packets observed at the firewall 110. If this consecutive-count exceeds a predetermined threshold, then the IP-flow at the firewall 110 is terminated. In another example, the ICMP-error message count is calculated as a percentage of the incoming packets from the multimedia server. If the percentage of the ICMP-packet response to incoming IP-packets exceed a predetermined percentage-threshold, the IP-flow is terminated at the firewall 110. In both examples, the error count is compared to a predetermined threshold for a time interval. If the error count does not reach the predetermined threshold, the firewall 110 connection is kept alive. Another condition which may cause IP-flow termination at firewall is a situation in which ICMP ERROR packets are sent back by the wireless device 13a for a predetermined number of packets and then additional ICMP-ERROR packets from mobile device are not generated. In such a scenario, IP-response packets are not sent thereafter while incoming IP-packet flow continues unabated. In this condition, if no IP-response packets are received by the firewall 110 for incoming IP-packets for a predetermined time-threshold then the IP-flow is terminated at the firewall 110.

There may be additional error messages (e.g., ICMP ERROR) generated by the gateway server 107, as indicated by the dotted lines in connection with steps 3a to 3b. Each error message is forwarded to the multimedia server 41 and counted by the firewall 110. When the number of error messages exceeds a predetermined threshold within a second predetermined time then the firewall prevents any further data (e.g., UDP stream content) from the multimedia server 41 (i.e., step 4). For example, the criteria may be 5 (e.g., consecutive) error messages per second.

Thus, in step 5/6, any additional content that is provided by the multimedia server 41 is blocked by the firewall. Put differently, the multimedia server 41 that originally provided the data (e.g., content) to the wireless device 13a and was subject to receiving the error messages (e.g., ICMP ERROR) is no longer allowed to reach the gateway server 107. Accordingly, since the gateway server 107 calculates data usage, the user account of the wireless device 13a cannot be tolled for the content provided by the multimedia server 41 (i.e., step 7).

As discussed above, functions relating to sending error messages, monitoring the error count, and blocking data may be implemented on computers connected for data communication via the components of a packet data network, operating as the gateway server 107 and/or as a multimedia server 41 as shown in FIG. 1. Although special purpose devices may be used, such devices also may be implemented using one or more hardware platforms intended to represent a general class of data processing device commonly used to run "server" programming so as to implement the network status information functions discussed above, albeit with an appropriate network connection for data communication.

Figure 4:
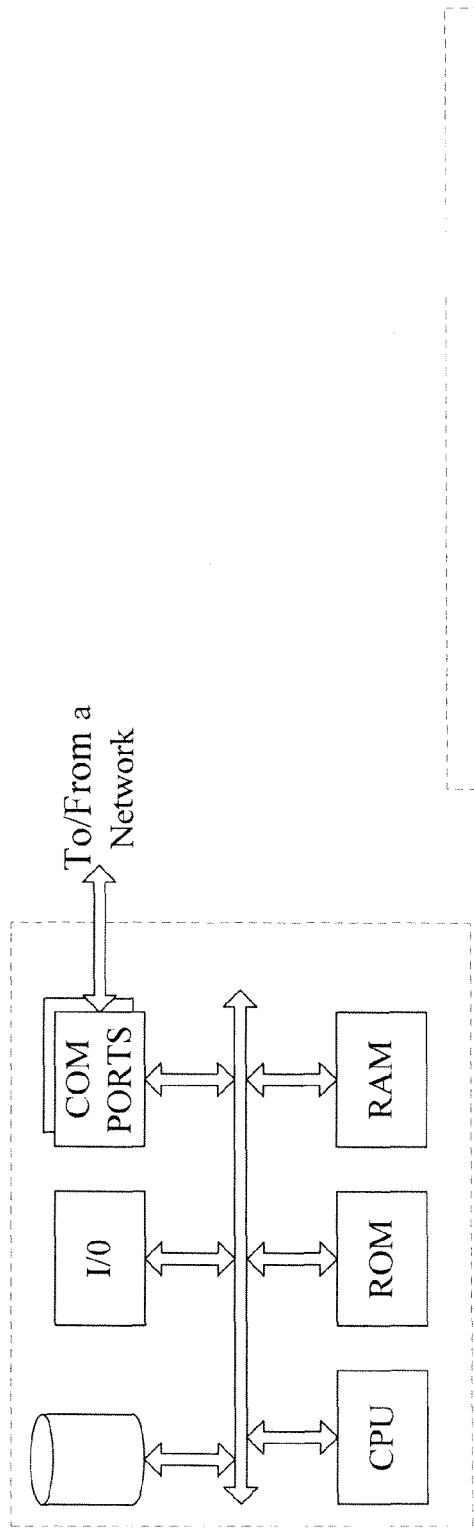
FIG. 4 illustrates a network or host computer.
Figure 5:
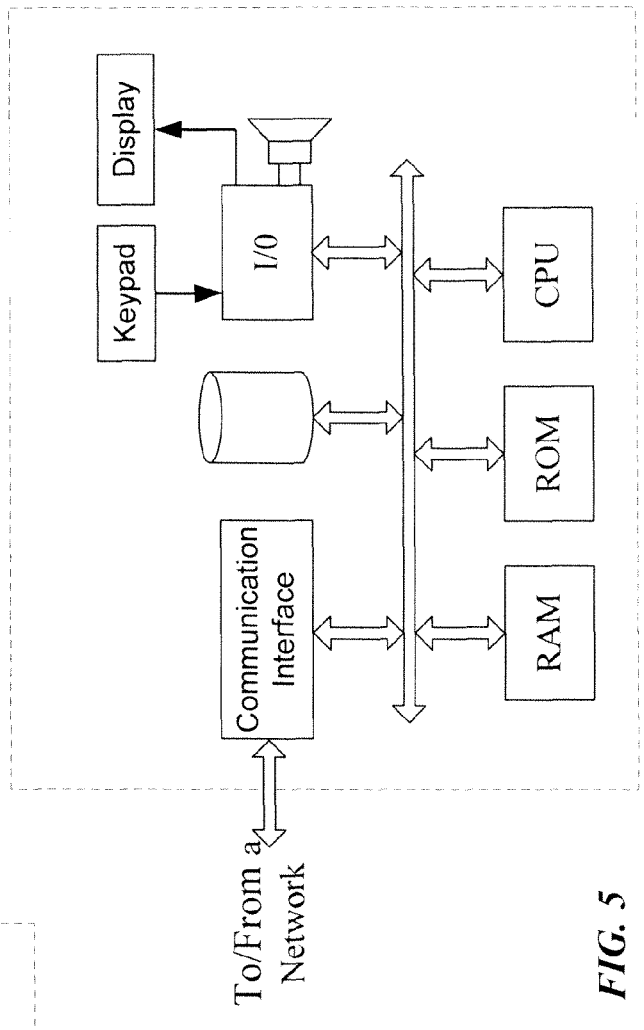
FIG. 5 illustrates a computer with user interface elements.

FIGS. 4 and 5 provide functional block diagram illustrations of general purpose computer hardware platforms. FIG. 4 illustrates a network or host computer platform, as may typically be used to implement a server. FIG. 5 depicts a device with user interface elements, as may be used to implement a personal computer, such as computer 13d or 50 of FIG. 1, or a workstation. FIG. 5 can also be used to implement a wireless device, such as a portable handset, a smart-phone, tablet computer, a personal digital assistant or other type of mobile station or mobile terminal device (e.g., devices 13a to 13d of FIG. 1). The device of FIG. 5 may also act as a server if appropriately programmed. It is believed that the general structure and general operation of such equipment as shown in FIGS. 4 and 5 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, one or more such computer hardware platforms would run server programming, for example, to provide account status information (e.g., server 43), multimedia content (e.g., server 41), block data traffic (e.g., firewall 110), etc., to a wireless device (e.g., 13a to 13d) as illustrated in FIG. 1.

A user terminal such as a general-purpose personal computer or a wireless device typically comprises a central processor or other processing device, an internal communication bus, various types of memory or storage multimedia (RAM, ROM, EEPROM, cache memory, disk or flash drives for mass storage, etc.) for code and data storage, and one or more network or communication interfaces or ports for communication purposes. The software functionalities involve programming, including executable code as well as associated stored data, e.g. files used for applications on the wireless device to process the instructions received from the network. The software code is executable by the wireless device. In operation, the code is stored within the wireless device. At other times, however, the software may be stored at other locations and/or transported for loading into the appropriate wireless device system. Execution of such code by a processor of the wireless device enables the wireless device to perform functions of receiving content from a multimedia server and to send error messages through the mobile traffic network, in essentially the manner performed in the implementations discussed and illustrated herein.

Hence, aspects of the methods of sending error messages and/or determining whether data traffic criteria are met as outlined above may be embodied in programming. Program aspects of the technology may be thought of as "products" or "articles of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has used a large number of acronyms to refer to various services, notification messages, and system components. Although generally known, use of several of these acronyms is not strictly standardized in the art. For the convenience of the reader, the following list correlates terms to acronyms, as used by way of example in the detailed description above.

BS—Base Station
BTS—Base Transceiver System

CPU—Central Processing Unit
EPC—Evolved Packet Core
EPS—Evolved Packet System
EPROM—Erasable Programmable Read Only Memory
EEPROM—Electrically Erasable Programmable Read Only Memory
GGSN—General Packet Radio Service Core Network
HA—High Availability
ICMP—Internet Control Message Protocol
IP—Internet Protocol
IPTV—Internet Protocol Television
LAN—Local Area Network
MMSC—Multimedia Messaging Service Center
PDA—Personal Digital Assistant
PDN—Packet Data Network
PGW—Packet Data Network Gateway
PROM—Programmable Read Only Memory
PSTN—Public Switched Telephone Network
QoS—Quality of Service
RAM—Random Access Memory
RAN—Radio Access Network
ROM—Read Only Memory
TCP—Transmission Control Protocol
UDP—User Datagram Protocol
WAN—Wide Area Network
WCDMA—Wideband Code Division Multiple Access

What is claimed is:

1. A method comprising:
receiving, by a firewall and from a multimedia server, one or more multimedia data packets addressed to a wireless device, the multimedia data packets included in a multicast data stream and comprising data representative of multimedia content requested by a user of the wireless device;
transmitting, by the firewall, the multimedia data packets addressed to the wireless device to a gateway server for delivery through a mobile traffic network to the wireless device, the gateway server configured to track, for billing purposes, an amount of data packets communicated to and from the wireless device;
receiving and counting, by the firewall, a number of error messages generated by at least one of the wireless device and the gateway server and forwarding the error messages to the multimedia server;
determining, by the firewall, that the number of error messages meets a predetermined criterion, the predetermined criterion including at least one of:
a number of consecutive error messages exceeding a first threshold within a first predetermined time; and
a percentage of error messages to a number of data packets from the multimedia server addressed to the wireless device exceeding a predetermined percentage-threshold within a predetermined time; and
blocking, by the firewall, additional multimedia data packets received from the multimedia server and addressed to the wireless device from transmission to the gateway server, in response to the determining that the number of error messages meets the predetermined criterion.

2. The method of claim 1, further comprising:
determining, by the firewall, that the number of error messages is below a second threshold within a second predetermined time; and
resuming, by the firewall, transmission of multimedia data packets from the multimedia server addressed to the wireless device via the gateway server in response to the determining that the number of error messages is below the second threshold within the second predetermined time.

3. The method of claim 2, wherein:
the first threshold is equal to the second threshold; and
a duration of the first predetermined time is equal to a duration of the second predetermined time.

4. The method of claim 1, further comprising:
calculating, by the firewall, a time difference between consecutive error messages; and
resetting, by the firewall, the error count upon determining that the time difference between consecutive error messages is above a third threshold.

5. The method of claim 1, further comprising:
analyzing, by the firewall, the multimedia data packets addressed to the wireless device; and
blocking, by the firewall, the multimedia data packets that match a predetermined rule set based on the analyzing.

6. The method of claim 1, wherein the error messages are Internet Control Message Protocol (ICMP) error messages.

7. A computer system configured as at least one server, the computer system comprising:
a processor;
a network interface coupled to the processor and configured to enable communications via a communication network;
at least one storage device accessible by the processor for content and programming;
a program stored in the storage device, wherein execution of the program by the processor configures the computer system to perform functions, including functions to:
receive, from a multimedia server, one or more multimedia data packets addressed to a wireless device, the multimedia data packets comprising data representative of multimedia content requested by a user of the wireless device;
transmit the multimedia data packets addressed to the wireless device to a gateway server for delivery through the communication network to the wireless device, the gateway server configured to track, for billing purposes, an amount of data packets communicated to and from the wireless device;
receive and count a number of error messages generated by at least one of the wireless device and the gateway server and forwarding the error messages to the multimedia server;
determine that the number of error messages meets a predetermined criterion, the predetermined criterion including at least one of:
a number of consecutive error messages exceeding a first threshold within a first predetermined time; and
a percentage of error messages to a number of multimedia data packets from the multimedia server addressed to the wireless device exceeding a predetermined percentage-threshold within a predetermined time; and
block additional multimedia data packets received from the multimedia server and addressed to the wireless device from transmission to the gateway server, in response to the determination that the number of error messages meets the predetermined criterion.

8. The system of claim 7, wherein execution of the program by the processor further configures the computer system to perform functions to:

determine that the number of error messages are below a second threshold within a second predetermined time; and resume transmission of multimedia data packets from the multimedia server addressed to the wireless device via the gateway server in response to the determination that the number of error messages is below the second threshold within the second predetermined time.

9. The system of claim 8, wherein:
the first threshold is equal to the second threshold; and
a duration of the first predetermined time is equal to a duration of the second predetermined time.

10. The system of claim 7, wherein execution of the program by the processor further configures the computer system to perform functions to:
calculate a time difference between consecutive error messages;
determine that the time difference between consecutive error messages is above a third threshold; and
reset the error count in response to the determination that the time difference between consecutive error messages is above a third threshold.

11. The system of claim 7, wherein execution of the program by the processor further configures the computer system to perform functions to:
analyze the multimedia data packets addressed to the wireless device; and
block the multimedia data packets that match a predetermined rule set based on the analysis.

12. The system of claim 7, wherein the error messages are Internet Control Message Protocol (ICMP) error messages.

13. A system comprising:
a gateway server coupled to a mobile traffic network configured to provide wireless data communication for a wireless device with a multimedia data server via a data network; and
a firewall coupled between the data network and the gateway server;
wherein:
the gateway server is configured to:
communicate multimedia data packets to and from the wireless device through the mobile traffic network;
track an amount of multimedia data packets communicated to and from the wireless device;
provide data usage information to a billing server, the data usage information based on the tracked amount of multimedia packets; and
transmit error messages received from the wireless device to the firewall; and
the firewall is configured to:
provide a security layer to prevent unauthorized access to the mobile traffic network by a device external to the mobile traffic network;
receive, from the multimedia server through the data network, one or more multimedia data packets addressed to the wireless device;
transmit the multimedia data packets addressed to the wireless device to the gateway server;
receive and count a number of error messages generated by at least one of the wireless device and the gateway server and forward the error messages to the multimedia server;
determine that the number of error messages meets a predetermined criterion, the predetermined criterion including at least one of:
a number of consecutive error messages exceeding a first threshold within a first predetermined time; and
a percentage of error messages to a number of multimedia data packets from the multimedia server addressed to the wireless device exceeding a predetermined percentage-threshold within a predetermined time; and
block additional multimedia data packets received from the multimedia server and addressed to the wireless device from transmission to the gateway server, in response to the determination that the number of error messages meets a predetermined criterion.

14. The system of claim 13, wherein the gateway server is further configured to generate error messages to the firewall when the wireless device is not available.

15. The system of claim 13, wherein the firewall is further configured to:
determine that the number of error messages is below a second threshold within a second predetermined time; and
transmit multimedia data packets from the multimedia server addressed to the wireless device via the gateway server in response to the determination that the number of error messages is below the second threshold within the second predetermined time.

16. The system of claim 15, wherein:
the first threshold is equal to the second threshold; and
a duration of the first predetermined time is equal to a duration of the second predetermined time.

17. The system of claim 13, wherein the firewall is further configured to:
calculate a time difference between consecutive error messages;
determine that the time difference between consecutive error messages is above a threshold; and
reset the error count in response to the determination that the time difference between consecutive error messages is above the threshold.

18. The system of claim 13, wherein the firewall is further configured to:
analyze the multimedia data packets addressed to the wireless device; and
block the multimedia data packets that match a predetermined rule set based on the analysis.

19. The system of claim 13, wherein the error messages are Internet Control Message Protocol (ICMP) error messages.

20. The method of claim 1, further comprising providing, by the firewall, a security layer to prevent unauthorized access to the mobile traffic network by a device external to the mobile traffic network.

21. The method of claim 20, wherein the providing of the security layer to prevent unauthorized access to the mobile traffic network comprises:
receiving one or more data packets addressed to the wireless device;
analyzing the received one or more data packets according to a predetermined rule set;
determining, based on the analyzing of the received one or more data packets, that the received one or more data packets meet the predetermined rule set; and
upon determining that the received one or more data packets meet the predetermined rule set, forwarding the one or more data packets to the wireless device by way of the mobile traffic network.

22. The method of claim 1, wherein the gateway server is further configured to provide data usage information of the wireless device to a billing server, the data usage information based on the tracked amount of multimedia data packets.

* * * * *